United States Patent
Fryda et al.

(10) Patent No.: US 11,198,609 B2
(45) Date of Patent: Dec. 14, 2021

(54) METHOD FOR PRODUCING DILUTED HYDROFLUORIC ACID

(71) Applicant: CONDIAS GMBH, Itzehoe (DE)

(72) Inventors: Matthias Fryda, Itzehoe (DE); Thorsten Matthèe, Hohenaspe (DE)

(73) Assignee: CONDIAS GMBH, Itzehoe (DE)

(*) Notice: Subject to any disclaimer, the term of this patent is extended or adjusted under 35 U.S.C. 154(b) by 612 days.

(21) Appl. No.: 15/561,111

(22) PCT Filed: Mar. 24, 2016

(86) PCT No.: PCT/EP2016/056548
§ 371 (c)(1),
(2) Date: Sep. 25, 2017

(87) PCT Pub. No.: WO2016/151089
PCT Pub. Date: Sep. 29, 2016

(65) Prior Publication Data
US 2018/0148332 A1    May 31, 2018

(30) Foreign Application Priority Data
Mar. 25, 2015 (DE) .................. 10 2015 004 101.0

(51) Int. Cl.
*C01B 7/19* (2006.01)
*C25B 1/13* (2006.01)
(Continued)

(52) U.S. Cl.
CPC .............. *C01B 7/194* (2013.01); *B01D 61/44* (2013.01); *C01B 7/191* (2013.01); *C01B 7/198* (2013.01);
(Continued)

(58) Field of Classification Search
CPC ......... B01D 61/44; C01B 13/10; C01B 7/191; C01B 7/194; C01B 7/198; C25B 9/19;
(Continued)

(56) References Cited

U.S. PATENT DOCUMENTS 3,256,164 A    6/1966  Donohue et al.
3,450,609 A *  6/1969  Carlin ..................... C25B 1/245
                                                             205/556

(Continued)

FOREIGN PATENT DOCUMENTS

DE    1 667 674 A1    7/1971
DE    23 03 072 A     8/1973
DE    30 03 781 A1    9/1981

*Primary Examiner* — Anthony J Zimmer
*Assistant Examiner* — Syed T Iqbal
(74) *Attorney, Agent, or Firm* — W&C IP

(57) ABSTRACT

The invention relates to a method and a device for producing diluted hydrofluoric acid using an electrode arrangement (1), which has an anode chamber (2) with an anode (4) and a cathode chamber (6) with a cathode (8), which are separated from one another by an anion exchange membrane (10), wherein in the method—pure water is guided through the anode chamber (2), —pure water, which includes at least one electrolyte which forms fluoride ions (F−), is guided through the cathode chamber (6), —and an electrical voltage is applied between the anode (4) and the cathode (8) such that the fluoride ions (F−) are moved through the anion exchange membrane (10) into the anode chamber (2), and an electrical current flows.

10 Claims, 1 Drawing Sheet

(51) Int. Cl.
*C25B 1/245* (2021.01)
*B01D 61/44* (2006.01)
*C01B 13/10* (2006.01)
*C25B 9/19* (2021.01)
*C25B 9/23* (2021.01)

(52) U.S. Cl.
CPC ............... *C01B 13/10* (2013.01); *C25B 1/13* (2013.01); *C25B 1/245* (2013.01); *C25B 9/19* (2021.01); *C25B 9/23* (2021.01)

(58) Field of Classification Search
CPC .. C25B 9/23; C25B 1/13; C25B 1/245; C25B 15/02
See application file for complete search history.

(56) References Cited

U.S. PATENT DOCUMENTS

| | | | |
|---|---|---|---|
| 3,787,304 A | 1/1974 | Chlanda | |
| 4,375,395 A * | 3/1983 | Foller | C25B 1/00 204/294 |
| 5,413,682 A | 5/1995 | Thornton et al. | |
| 6,479,443 B1 * | 11/2002 | Zhang | C11D 7/08 134/2 |
| 2007/0215477 A1 * | 9/2007 | Akahori | C25B 1/02 204/627 |

* cited by examiner

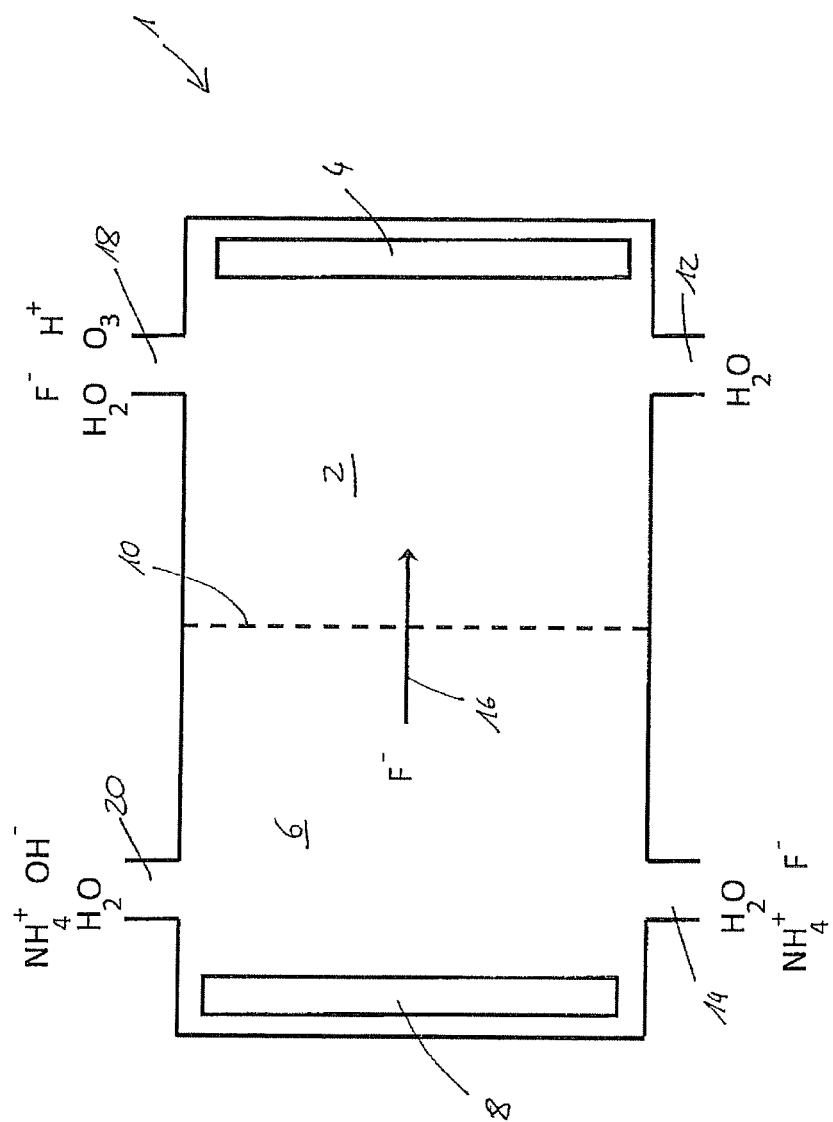

METHOD FOR PRODUCING DILUTED HYDROFLUORIC ACID

The invention relates to a method for producing dilute hydrofluoric acid, to a method for handling dilute hydrofluoric acid, and to an apparatus for carrying out such a method.

Hydrofluoric acid, also called fluorhydric acid, is an aqueous solution of hydrogen fluoride (HF). It is used as an etchant in a host of technical applications. For example, glasses can be made matt or bright-etched, or paint layers can be removed in a targeted way from a glass substrate. One of the largest areas of application of hydrofluoric acid, however, is its use as an etchant and cleaner in semiconductor production, where it is used in highly diluted form for cleaning areas of silicon that are to be worked on. Surface impurities, which may consist in particular of silicon dioxide, can be removed. For these applications, hydrofluoric acid is used in general in highly diluted form, as for example in an aqueous solution with a concentration of a few parts per thousand. Prior to use, however, the hydrofluoric acid is not stored in this diluted form, but is instead accommodated in concentrated form in tanks. For use, the hydrofluoric acid thus stored is diluted to the desired concentration. A disadvantage, however, is that setting the desired concentration, particularly in the case of low and ultralow concentrations of a few parts per thousand or less, is technically complex, because the desired concentration must be set with maximum accuracy.

Another disadvantage of hydrofluoric acid is that it is a strong contact poison. Hydrofluoric acid burns may lead to the point of amputation of the body part affected, to severe, acutely threatening metabolic disorders, going as far as multiple organ failure, and to death.

It is an object of the present invention, therefore, to propose a method for producing hydrofluoric acid and also a method for handling hydrofluoric acid that allow even low and ultralow concentrations of hydrofluoric acid to be produced easily and accurately, and with which the workplace safety when operating with hydrofluoric acid can be enhanced.

The invention achieves the stated object by means of a method for producing dilute hydrofluoric acid by means of an electrode arrangement which comprises an anode chamber having an anode and a cathode chamber having a cathode, which are separated from one another by an anion exchange membrane, where in the method pure water is passed through the anode chamber and pure water containing at least one electrolyte which forms fluoride ions is passed through the cathode chamber and an electrical voltage is applied between the anode and the cathode, so that the fluoride ions are moved through the anion exchange membrane into the anode chamber and an electrical current flows.

Introduced into the anode chamber, then, is pure water, ultrapure water or distilled water. The electrical voltage between anode and cathode causes hydronium cations ($H^+$) to form within the water. The cathode chamber contains pure water containing at least one electrolyte by which fluoride ions ($F^-$) are formed. As a result of the electrical voltage between anode and cathode, these fluoride ions are moved through the anion exchange membrane into the anode chamber. That chamber accordingly, contains not only the distilled water but also hydronium ions and fluoride ions. Consequently a dilute hydrofluoric acid is formed. The concentration of the dilute hydrofluoric acid thus formed can be very precise, even for low and ultralow concentrations, down to concentrations in the ppm range (ppm: parts per million).

The ammonium fluoride concentration may lie advantageously in the range from 10 ppm to 20 000 ppm. Advantageously it lies between 100 ppm and 5000 ppm, more preferably between 500 ppm and 2000 ppm. The current densities employed at the electrodes are between 10 mA/cm$^2$ and 250 mA/cm$^2$ anode area. Advantageous figures are 50 to 150 mA/cm$^2$ anode area. Volume flows in the cathode chamber are preferably between 0.1 and 10 l/min, while the anodic volume flows are 1 to 50 l/min, preferably 2 to 20 l/min, more preferably 4 to 6 l/min.

Located between the anode chamber and the cathode chamber is an anion exchange membrane through which, accordingly, only anions—that is, negatively charged ions—are able to switch from the cathode chamber to the anode chamber. Because cations—that is, positively charged ions—are unable to move through the anion exchange membrane, there are no disruptive metal ions or other cationic impurities at all in the dilute hydrofluoric acid which is formed in the anode chamber. If, then, the dilute hydrofluoric acid thus produced is used for cleaning surfaces, particularly to remove metallic residues, the entrainment by the dilute hydrofluoric acid of metallic impurities, and the deposition of such impurities on the surface which is actually to be cleaned, is almost entirely ruled out, but advantageously ruled out completely, in this way.

The electrolyte advantageously comprises ammonium fluoride. In the pure water supplied together with this electrolyte to the cathode chamber, therefore, the water is accompanied by ammonium ions ($NH_4^+$) and by the aforementioned fluoride ions ($F^-$).

In one preferred embodiment of the method, a concentration of the dilute hydrofluoric acid to be produced is adjusted to a predetermined value by adjusting the concentration of the at least one electrolyte and/or by adjusting the electrical current. By changing the concentration of the at least one electrolyte which is added to the pure water supplied to the cathode chamber, it is also possible to influence the concentration of fluoride ions in the cathode chamber. This allows control over how many of the fluoride ions can be moved through the anion exchange membrane into the anode chamber.

By changing the electrical voltage and the electrical current it is possible to adjust the number of hydronium ions ($H^+$) formed. Since fluoride ions which are moved through the anion exchange membrane into the anode chamber do not become neutral fluorine atoms even when they are directly in contact with the anode, this being impossible in aqueous solution because of the insufficient electrical potential of the anode, the entire current flow is realized through the formation of hydronium ions. Hence there is a regulating variable available that is very exactly measurable and adjustable, to allow the desired concentration, particularly of hydronium ions, to be adjusted easily and nevertheless exactly.

With preference, ozone as well is formed in the anode chamber. Ozone too is used in numerous technical applications, as a disinfectant and cleaner. In many applications, moreover, it is known practice to use ozone and dilute hydrofluoric acid simultaneously in order further to improve the outcome of cleaning and etching. Known from the prior art are methods wherein first of all ozone and dilute hydrofluoric acid are prepared separately and subsequently mixed with one another. In that case it must be borne in mind that in the course of mixing, the individual concentrations of ozone and of the dilute hydrofluoric acid are altered again relative to the total amount of the liquid. A method of this kind is costly and inconvenient in terms of control and regulation and of the apparatus involved, since first of all hydrofluoric acid and ozone must be separately produced and must then be mixed in a third apparatus. In the case of the method according to the working example of the present invention that is given here, ozone and dilute hydrofluoric acid are produced simultaneously by the same mechanisms in the same liquid container, namely the anode chamber.

The concentration of the ozone formed is preferably adjusted to a predetermined value by adjusting the electrical current. An advantage in particular is that the concentration of ozone formed and the concentration of the dilute hydrofluoric acid to be produced can be adjusted independently of one another. This is possible by way of the two control parameters of the electrical current and of the electrolyte concentration. It is possible accordingly to tailor the mixture of dilute hydrofluoric acid and ozone to the desired requirements.

The invention further achieves the stated object by means of a method for handling dilute hydrofluoric acid, wherein the dilute hydrofluoric acid is mixed with water containing cations of an electrolyte. As already maintained, even highly dilute hydrofluoric acid harbors a great hazard potential and health risk for individuals working with this substance. It is therefore not only of interest to provide a method with which hydrofluoric acid can be produced in a very highly diluted form but with precisely mandatable concentration, but there is also demand for a method by which this dilute hydrofluoric acid is treated in order to reduce the hazard potential it presents, when it is no longer being used. For this purpose, in accordance with the invention, the dilute hydrofluoric acid is mixed with water containing cations of an electrolyte. Advantageously, moreover, the electrolyte forms fluoride ions. With particular advantage these fluoride ions are no longer present, or are present only at reduced concentration, in the water/cation mixture. It has emerged as being particularly advantageous if the cations are ammonium ions.

One particularly advantageous method for handling dilute hydrofluoric acid begins, consequently, first with the production of the dilute hydrofluoric acid according to one of the methods described in more detail above. Whereas the dilute hydrofluoric acid is formed in the anode chamber, and is diverted through an anode chamber outlet of the anode chamber and supplied for use, the cations of the electrolyte remain in a form in solution in water in the cathode chamber, these cations hence advantageously being ammonium ions. At a later time, when the dilute hydrofluoric acid has been used for the desired purposes and where appropriate requires disposal, it is mixed with this mixture of water and electrolyte cations. In this way, water with electrolyte ions dissolved therein is formed again, thereby significantly reducing the hazard potential and the operating risks. At the same time, this liquid with the ions contained therein can be supplied again to the cathode chamber of the electrode arrangement. This reduces not only the amount of wastewater but also the production and process costs, allowing the method to be carried out more exactly, more safely, and more cost-effectively.

The invention further achieves the stated object by means of an apparatus for carrying out a method described herein, said apparatus comprising in particular an anode chamber with an anode, a cathode chamber with a cathode, and an anion exchange membrane separating the anode chamber from the cathode chamber. The apparatus further possesses at least one sensor for determining the concentration of the electrolyte and/or at least one sensor for determining the electrical current, which may be an ampere meter, for example. The concentration of the electrolyte may be ascertained, for example, from measurements of the electrical conductivity. An electrical control additionally possessed by the apparatus is set up advantageously to carry out the methods described. More particularly it is set up to regulate and/or to control the electrical voltage and/or the electrical current and/or the concentration of the electrolyte in the pure water of the cathode chamber, on the basis of the measurement values obtained from the sensors.

The anode and/or the cathode are preferably in the form of a diamond electrode. In this way, metal contamination by the electrode material is reliably avoided. Even the "dimensionally stable anodes" available on the market, which are mixed-oxide anodes, pose a high risk of metal contamination of the dilute hydrofluoric acid. Carbon anodes composed of graphite or glassy carbon are not sufficiently stable for the production of dilute hydrofluoric acid, and would corrode after a short time.

Alternatively, the methods described here, all with all working examples and advantages described, can also be used for producing peroxodisulfuric acid in likewise dilute form. In that case, the water which is supplied to the cathode chamber is not supplied with electrolytes which form fluoride ions; instead, at least one electrolyte which forms sulfate ions ($SO_4^{2-}$) is supplied. These sulfate ions are also moved through the anion exchange membrane into the anode chamber, where they form peroxodisulfate ions ($S_2O_8^{-2}$).

Formed in the cathode chamber from water and added electrons are gaseous hydrogen and hydroxide ions ($OH^-$). In the anode chamber, from the water present, protons ($H^+$) and also OH radicals, which in turn combine to form water and ozone. Protons ($H^+$) and hydroxide ions ($OH^-$) react in the autoprotolysis of the water, to give water. Without transfer of the fluoride ions from the cathode chamber into the anode chamber, the cathodically formed hydroxide ions would combine again with the anodically formed hydronium ions or protons, in accordance with the autoprotolysis of water, to form water molecules. Only ozonized water would be produced in the anode chamber. In particular because of the transport in the electrical field, however, fluoride ions additionally are also transported into the anode compartment. As a result of this, there is an increase in the hydronium ion concentration, to compensate the negative charges resulting from said transport, and in this way dilute hydrofluoric acid is formed. The concentration of the hydrofluoric acid is therefore dependent on the strength of the electrical field and on the cathodic fluoride ion concentration. This can be controlled through the concentration of the added electrolyte. The ozone concentration is a direct result of the anodic reaction and is therefore dependent solely on the current. Because the cathodic fluoride concentration, in other words the concentration of the added electrolyte, and the electrical current can be adjusted independently of one another, independent ozone concentrations and hydrofluoric acid concentrations are obtained, which can be adjusted separately from one another.

Within the cathode chamber, hydroxide ions formed from the electrolysis of water compensate the fluoride ions which have migrated into the anode compartment, and so ammonium hydroxide is formed in the cathode compartment. This solution can be again combined with the dilute hydrofluoric acid to give, again, ammonium fluoride, corresponding to the added electrolyte. Because the concentration of ammonium hydroxide corresponds exactly to the amount of fluoride ions which have migrated through the anion exchange membrane, and hence to the concentration of hydrofluoric acid, the liquid in the cathode chamber also always contains the right amount of ammonium hydroxide for complete neutralization of the hydrofluoric acid.

With the aid of the appended FIGURE, a working example of the present invention is elucidated in more detail hereinafter.

FIG. 1—shows the schematic sectional representation through an apparatus for carrying out a method according to a first working example of the present invention.

FIG. 1 shows an electrode arrangement 1 which comprises an anode chamber 2, in which there is an anode 4, and a cathode chamber 6, in which there is a cathode 8. Located between the anode chamber 2 and the cathode chamber 6 is an anion exchange membrane 10, which separates the anode chamber 2 from the cathode chamber 6. In the case of the method according to one working example of the present invention, pure water, distilled water or ultrapure water is introduced through an anode chamber inlet 12 into the anode chamber 2. At the same time, pure water, ultrapure water or distilled water containing an electrolyte which forms fluoride ions is passed through a cathode chamber inlet 14 into the cathode chamber 6. The fact that the cathode chamber 6 now contains not only water ($H_2O$) but also ammonium ions ($MH_4^+$) and fluoride ions ($F^-$) is represented schematically in FIG. 1.

An electrical voltage is applied between the anode 4 and the cathode 8. This causes the fluoride ions ($F^-$) to be accelerated along the arrow 16 in the direction of the anode 4. They are able to pass through the anion exchange membrane 10 and are then located in the anode chamber 2.

Through an anode chamber outlet 18, the constituents represented in FIG. 1 leave the anode chamber 2. These constituents are water, fluoride ions ($F^-$), and hydronium ions ($H^+$), which are produced by the electrical voltage between anode 4 and cathode 8. At the same time, ozone ($O_3$) is formed in the anode chamber 2, and likewise leaves the anode chamber 2 through the anode chamber outlet 18. The mixture present is therefore a mixture of dilute hydrofluoric acid, whose concentration can be adjusted very precisely even to low and very low levels, and ozone. This mixture is used in numerous applications in different sectors of industry.

Leaving the cathode chamber 8 from a cathode chamber outlet 20 are not only the water but also the ammonium ions ($NH_4^+$) and also hydroxide ions ($OH^-$).

In a further embodiment of this method, which is not depicted, the mixture of ozone and dilute hydrofluoric acid is supplied to its desired intention. It is subsequently mixed with the liquid withdrawn from the cathode chamber outlet 20. As a result, again, a mixture of water and electrolyte is produced, the health risk of this mixture being reduced significantly.

LIST OF REFERENCE NUMERALS

1—Electrode arrangement
2—Anode chamber
4—Anode
6—Cathode chamber
8—Cathode
10—Anion exchange membrane
12—Anode chamber inlet
14—Cathode chamber inlet
16—Arrow
18—Anode chamber outlet
20—Cathode chamber outlet

The invention claimed is:

1. A method for producing hydrofluoric acid with an electrode arrangement which comprises an anode chamber having an anode and a cathode chamber having a cathode wherein the anode and the cathode are separated from one another by an anion exchange membrane, comprising the steps of:
   passing distilled water through the anode chamber;
   passing an electrolyte that forms fluoride ions ($F^-$) through the cathode chamber;
   applying an electrical voltage between the anode and the cathode so that hydronium ions are formed within the distilled water of the anode chamber, and the fluoride ions ($F^-$) in the cathode chamber are moved through the anion exchange membrane into the anode chamber to form the hydrofluoric acid therein and an electrical current flows between the anode and the cathode, wherein the only cations in the anode chamber are the hydronium ions; and
   controlling a concentration of the hydrofluoric acid produced by controlling one or more of the concentration of the at least one electrolyte, and the electrical current.

2. The method as claimed in claim 1 wherein the at least one electrolyte comprises ammonium fluoride.

3. The method as claimed in claim 1 wherein the applying step also forms ozone in the anode chamber.

4. The method as claimed in claim 3 wherein a concentration of the ozone is adjusted by adjusting the electrical current.

5. The method as claimed in claim 1, further comprising adjusting a concentration of the hydronium ions.

6. A method for handling hydrofluoric acid, comprising the steps of
   producing the hydrofluoric acid with an electrode arrangement which comprises an anode chamber having an anode and a cathode chamber having a cathode wherein the anode and the cathode are separated from one another by an anion exchange membrane, the step of producing comprising the steps of:
   passing distilled water through the anode chamber;
   passing an electrolyte that forms fluoride ions ($F^-$) through the cathode chamber; and
   applying an electrical voltage between the anode and the cathode so that hydronium ions are formed within the distilled water of the anode chamber, and the fluoride ions ($F^-$) in the cathode chamber are moved through the anion exchange membrane into the anode chamber to form the hydrofluoric acid therein and an electrical current flows between the anode and the cathode, wherein the only cations in the anode chamber are the hydronium ions; and
   mixing the hydrofluoric acid with water containing cations of another electrolyte, wherein the mixing step is performed using water withdrawn from the cathode chamber.

7. The method as claimed in claim 6, wherein the cations of the mixing step comprise ammonium ions.

8. The method as claimed in claim 6, further comprising adjusting a concentration of the hydronium ions.

9. An apparatus for producing hydrofluoric acid, comprising:
   an anode chamber which has an anode;
   a cathode chamber which has a cathode;
   an anion exchange membrane, wherein the anode chamber and the cathode chamber are separated from one another by the anion exchange membrane; and an electrical control configured to
- pass distilled water through the anode chamber;
- pass an electrolyte that forms fluoride ions ($F^-$) through the cathode chamber; and
- apply an electrical voltage between the anode and the cathode so that hydronium ions are formed within the distilled water of the anode chamber, and the fluoride ions ($F^-$) in the cathode chamber are moved through the anion exchange membrane into the anode chamber to form the hydrofluoric acid therein and an electrical current flows between the anode and the cathode, wherein the only cations in the anode chamber are the hydronium ions.

10. The apparatus as claimed in claim 9, further comprising at least one sensor for determining a concentration of an electrolyte and/or at least one sensor for determining the electrical current, wherein the electrical control is configured to regulate one or more of the electrical voltage and a concentration of the at least one electrolyte on the basis of measurements from the at least one sensor.

* * * * *